INVENTORS
W.J. TOEPFER
W.A. STUTSKE
BY
ATTORNEYS

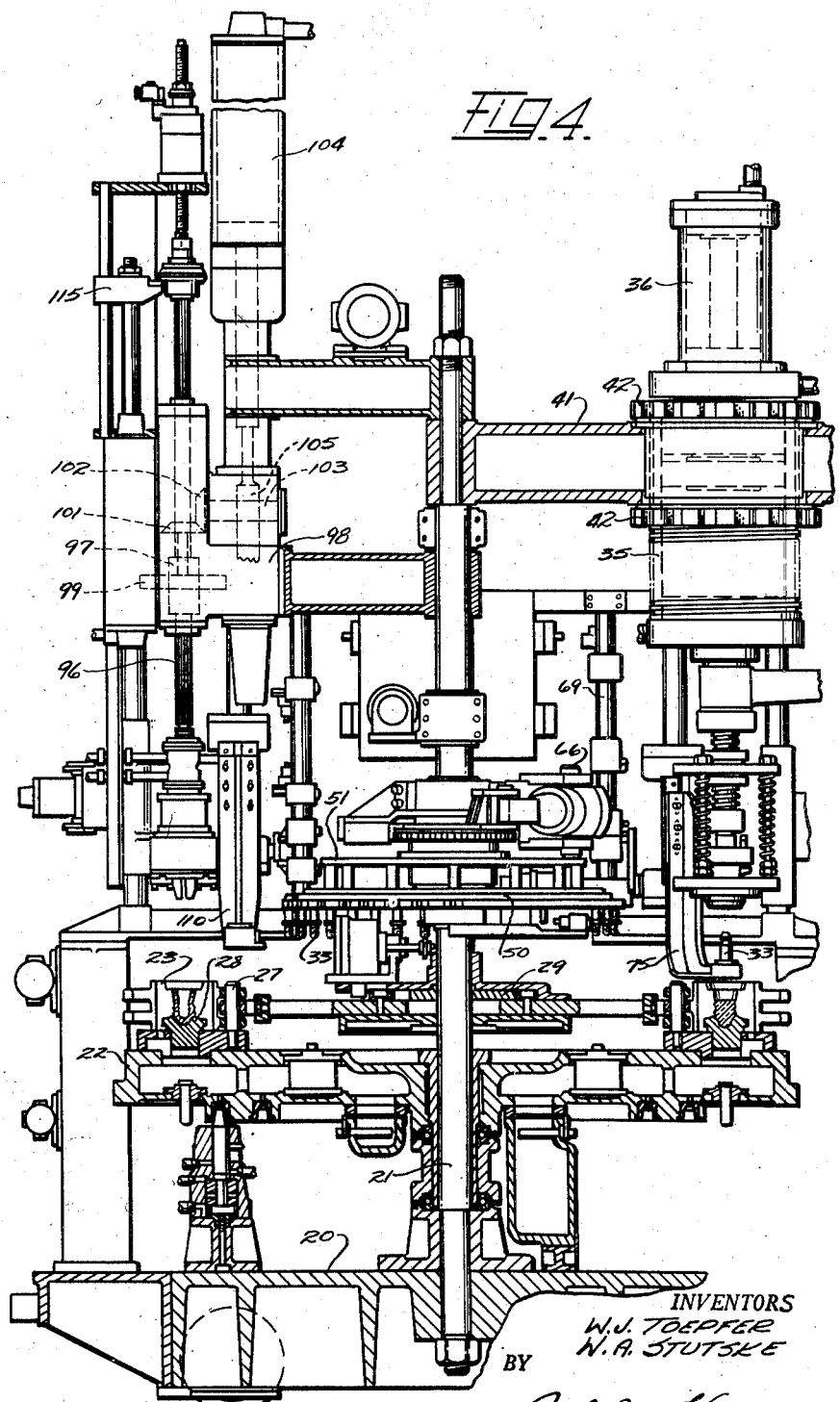

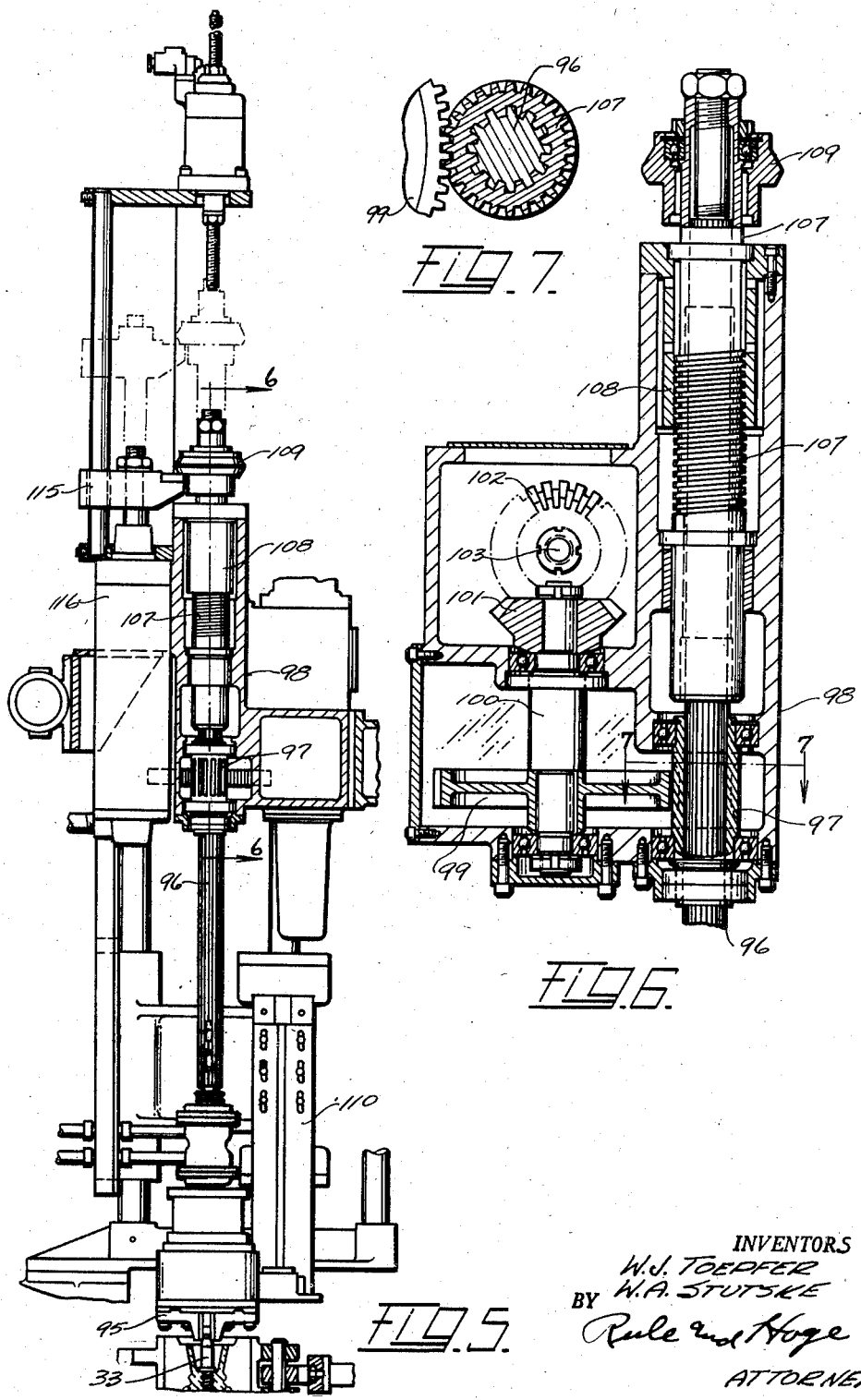

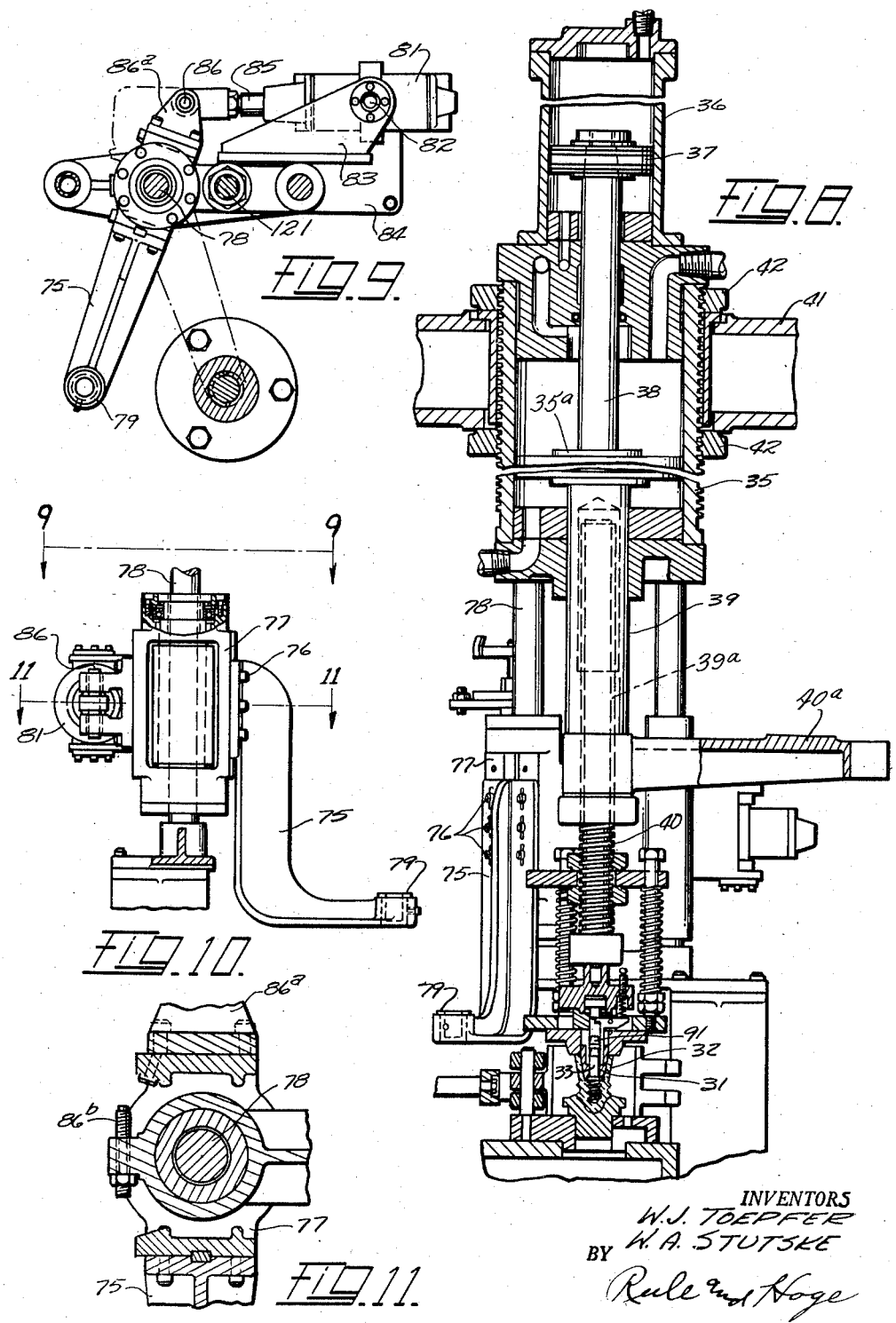

Dec. 9, 1958 W. J. TOEPFER ET AL 2,863,260
MACHINE FOR MOLDING GLASS ARTICLES
Filed Oct. 6, 1954 8 Sheets-Sheet 6
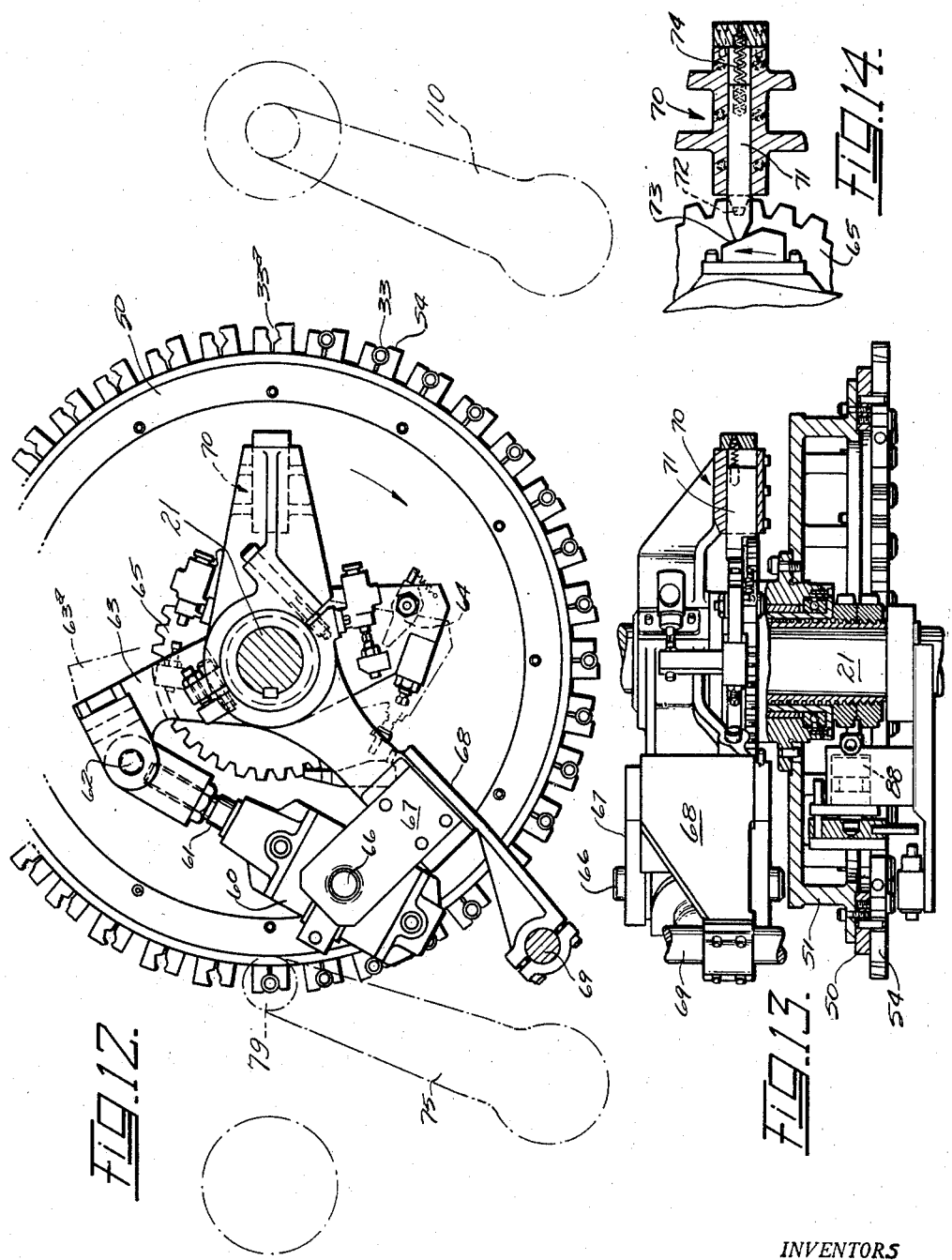
INVENTORS
W. J. TOEPFER
W. A. STUTSKE
BY
Rule and Hoge
ATTORNEYS

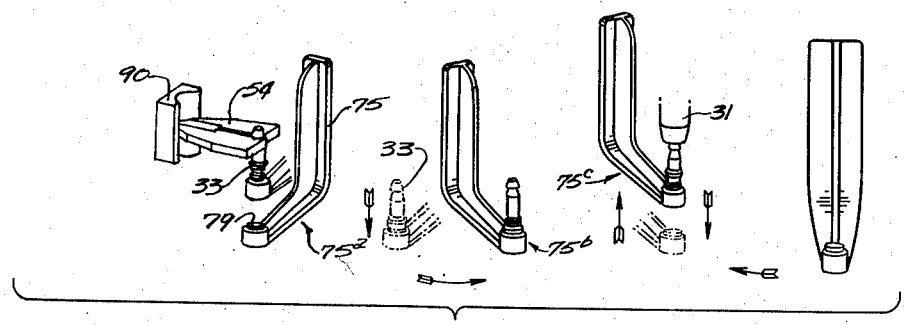
FIG.15.
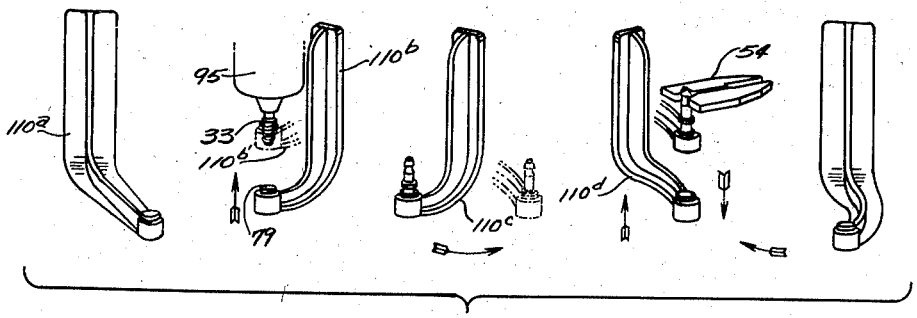
FIG.16.
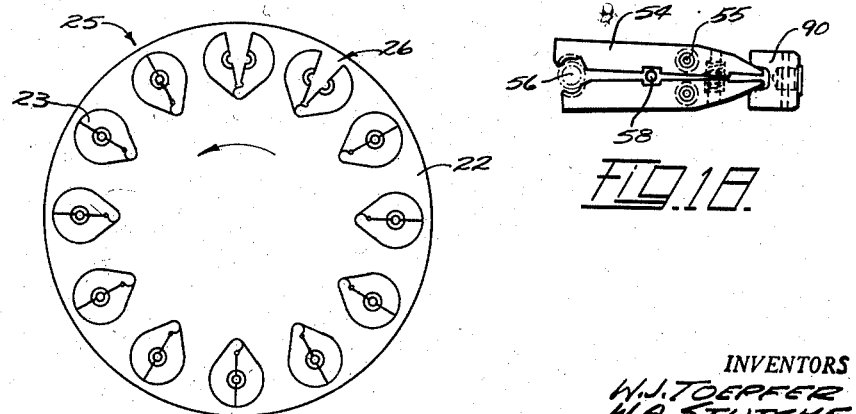
FIG.17.
FIG.18.
INVENTORS
W.J. TOEPFER
W.A. STUTSKE
BY
Rule and Hoge,
ATTORNEYS

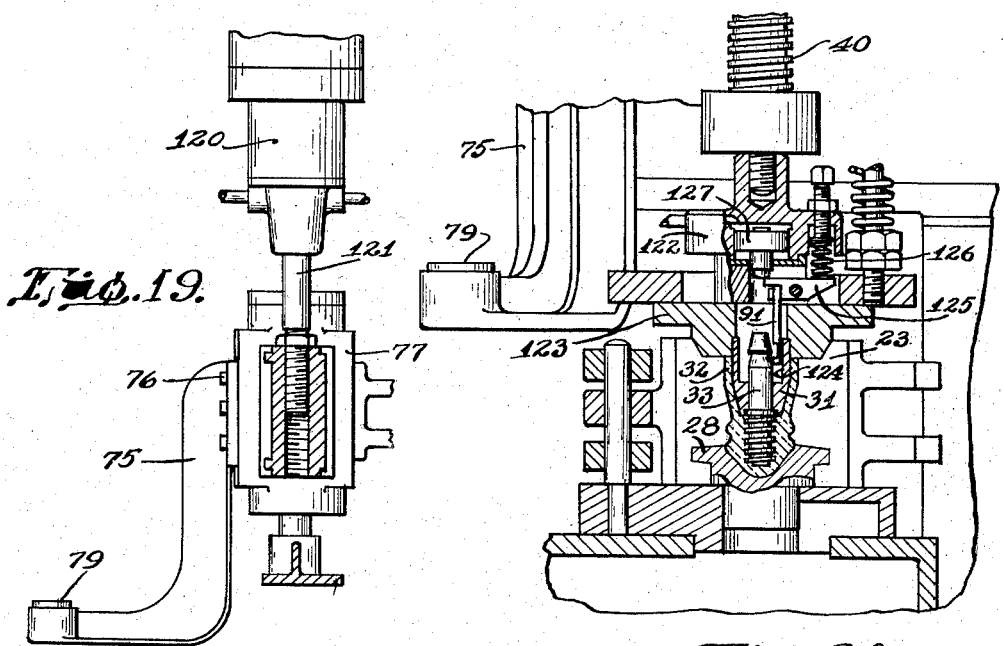
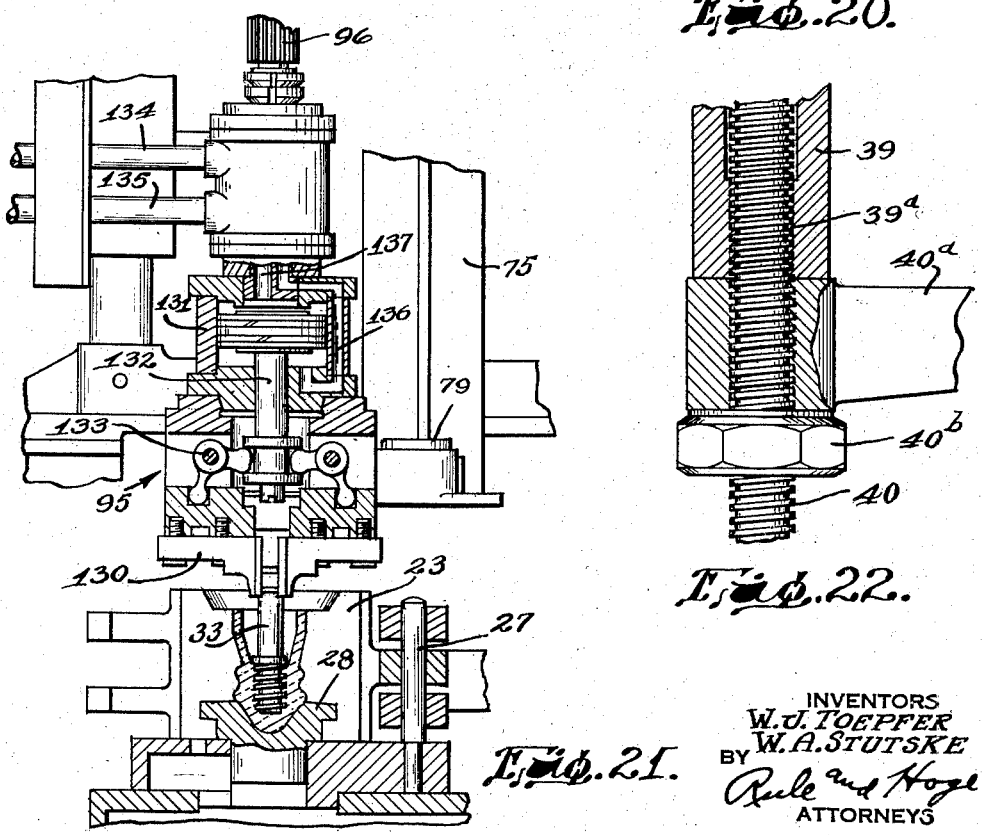

United States Patent Office 2,863,260
Patented Dec. 9, 1958

2,863,260

MACHINE FOR MOLDING GLASS ARTICLES

Walter J. Toepfer and William A. Stutske, Toledo, Ohio, assignors to Owens-Illinois Glass Company, a corporation of Ohio Application October 6, 1954, Serial No. 460,526

8 Claims. (Cl. 49—36)

Our invention relates to a machine for press molding hollow glass articles. It provides a novel method and means for molding the interior surfaces of the articles.

The machine as herein illustrated is particularly adapted for press molding glass insulators and forming screw threads on their interior surfaces. The invention may also be adapted and used for forming other articles.

The invention provides a machine wherein molding elements for molding the interior wall surfaces of the insulators are introduced into a charge of glass within the mold by a press plunger which concurrently presses and molds the charge of glass. In this way the glass is molded to conform to the shape of the insert. The mold is thereafter brought into cooperative relation with means for removing the insert. Such means comprises a chuck for gripping the insert and removing it from the molded article. For forming screw threads on the inner surface of the article the insert is provided with a screw thread and is removed from the molded article by a spiral rotation of the chuck.

The invention in its preferred form comprises an annular series of press molds on a mold carriage and means for rotating the mold carriage intermittently step by step. A plurality of screw threaded inserts, hereinafter referred to as screws, are carried on an annular conveyor which is rotated about the axis of the mold carriage. Means are provided for transferring the screws in succession to a press plunger and operating the latter to mold a charge of glass in the mold with the screw imbedded in the glass. As the mold carriage rotates step by step each mold with the imbedded screw is brought to a take-out station where the screw is gripped by a chuck. The chuck is then rotated spirally to unthread the screw from the molded article. A transfer arm then returns the screw to a holder on the screw conveyor. By the use of a plurality or multiplicity of such inserts or screws, their temperature may be controlled and overheating prevented. Cooling means such as air blowers may be used for applying cooling air to the screws on the screw conveyor. Burners may also be arranged for applying heat to the screws where required to control or vary the temperature of the screws.

Referring to the accompanying drawings which illustrate the invention as used for press molding insulators and forming interior screw threads thereon:

Fig. 4 is a part sectional elevational view of the machine, looking in a direction from the opposite side of the machine as viewed in Fig. 1;

Fig. 5 is a part sectional elevation of the means comprising a spindle and chuck for unthreading and lifting a screw from the molded article;

Fig. 6 is a sectional view on a larger scale, at the line 6—6 on Fig. 5;

Fig. 7 is a section at the line 7—7 on Fig. 6;

Fig. 8 is a sectional elevation of the press plunger mechanism;

Fig. 9 is a cross-section as indicated by the line 9—9 on Fig. 10 showing means for operating a transfer arm by which the screw is transferred from the screw carriage or conveyor to the press plunger;

Fig. 10 is an elevational view of the transfer arm;

Fig. 11 is a fragmentary cross section substantially at the line 11—11 on Fig. 10;

Fig. 12 is a plan view of the ring conveyor for the screws and the means for imparting step-by-step rotation to the conveyor;

Fig. 13 is a cross-sectional elevation of the mechanism shown in Fig. 12;

Fig. 14 is a detailed view of a holding detent and its operating means;

Fig. 15 is a view showing the successive steps in the operation of the transfer arm for transferring the screws from the screw conveyor to the press plunger;

Fig. 16 is a similar view showing the transfer arm for returning the screws from the press plunger to the screw conveyor;

Fig. 17 is a diagrammatic plan view of the mold carriage and molds;

Fig. 18 is a plan view of a pair of fingers by which the screw is held on the screw conveyor;

Fig. 19 is a part sectional view of a transfer arm and its lifting motor;

Fig. 20 is a sectional view of the press plunger mechanism shown in Fig. 8 but on a larger scale, with parts broken away;

Fig. 21 is a fragmentary part sectional elevation of the chuck and spindle for gripping and unthreading a screw from the molded article;

Fig. 22 is a fragmentary view showing a portion of the press plunger rod.

Figure 1:
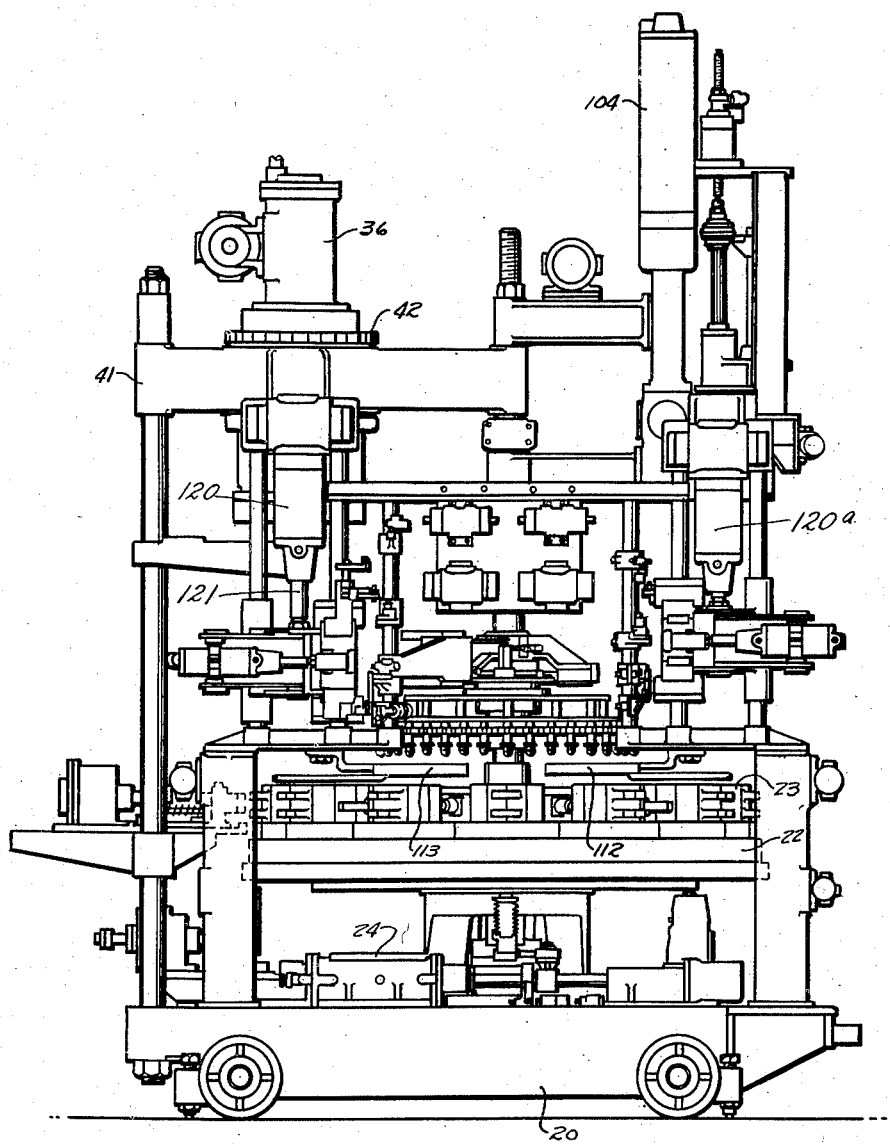
Fig. 1 is an elevational view of the machine.
Figure 2:
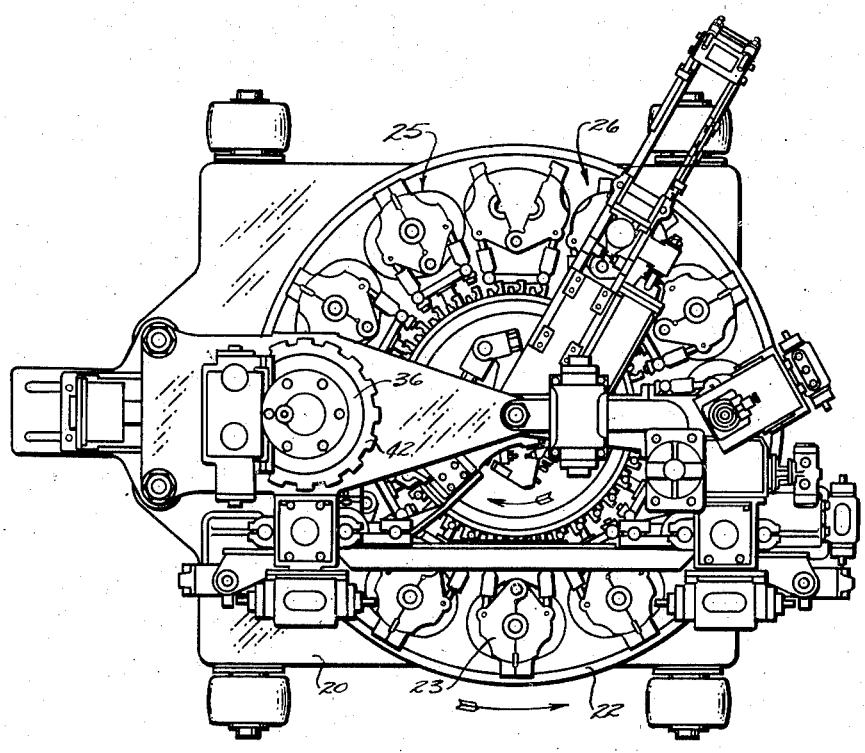
Fig. 2 is a plan view.

Referring particularly to Figs. 1, 2, and 4 the machine comprises a base 20 from which rises a vertical column or shaft 21. A molded carriage 22 is mounted for horizontal rotation about the axis of the shaft 21. Press molds 23 are mounted on the carriage and arranged in an annular series. An air motor 24 (Fig. 1) operates in a conventional manner to rotate the mold carriage intermittently step by step. Each step rotation of the carriage brings a mold to a charging station 25 (Figs. 2 and 17) where a mold charge or gob of molten glass is dropped into the mold. The charge remains in the mold until the latter is opened and reaches a discharge station 26 at which the molded article is removed. Each mold comprises a pair of partible body mold sections or halves, mounted to swing about a pivot 27 (Fig. 4) for opening and closing the mold, and a mold bottom 28. The opening and closing movements of the mold are under the control of a stationary cam 29 which operates in a well known manner as the carriage rotates.

The molds are shaped to form glass insulators and are brought in succession to a press plunger station where a press plunger 31, mounted for up and down movement, is projected downward for pressing and molding the glass. The mold and plunger are shaped to form an insulator in inverted position with a flared skirt 32 extended upwardly from the body portion of the insulator as shown in Figs. 8 and 20. A screw threaded opening is extended on downward below the skirt portion by means of a molding element 33. The latter is in the form of a cylindrical rod having the lower portion thereof screw threaded to form the screw thread on the interior surface of the insulator, said rod being herein termed a screw. A multiplicity of screws 33 are provided and are attached in succession to the press plunger in the manner hereinafter described.

The machine is powered and operated by air motors or cylinders individual to the various operating parts of the machine. The press plunger is operated by air pressure supplied to cylinders 35 and 36, either of which may be brought into service depending upon the amount of pressure desired for operating the plunger. The cylinders are carried by an arm 41 forming part of the machine frame and are adjustable up and down therein. Nuts 42 threaded on the cylinder 35 hold it in adjusted position. A piston 37 in the upper cylinder 36 is connected by a piston rod 38 to the piston 35ª of the cylinder 35. Attached to the piston 35ª and extending downward therefrom is a tubular piston rod 39. A plunger rod 40 extends upwardly within the hollow piston rod 39. The rod 40 is screw threaded through an internally threaded lower end portion 39ª (Fig. 22) of the piston rod 39, permitting up-and-down adjustment of the plunger rod 40. Rod 40 is also threaded through an opening in an arm 40ª and is held in adjusted position by lock nut 40ᵇ.

Attached to the plunger rod 40 at its lower end is a plunger head 122 which carries a molding plate 123 adapted to seat on the mold 23. The plate 123 has secured thereto a hollow plunger tip 124 which, when the plunger is lowered, enters the body mold cavity and molds the inner surface of the skirt portion of the insulator. The molding screw 33 is attached to the plunger as hereinafter described by moving it upwardly through an opening in the plunger tip 124 and is held in the plunger by a spring-actuated finger 91. This finger is attached to a pivoted arm 125. A compression spring 126 operates through the arm 125 to hold the clamping finger in gripping engagement with the screw 33. A piston motor 127 within the plunger head is operable when its piston is lowered to release latch 91. This permits the plunger to be withdrawn upward from the screw 33 and the insulator in which the screw is embedded.

Figure 3:
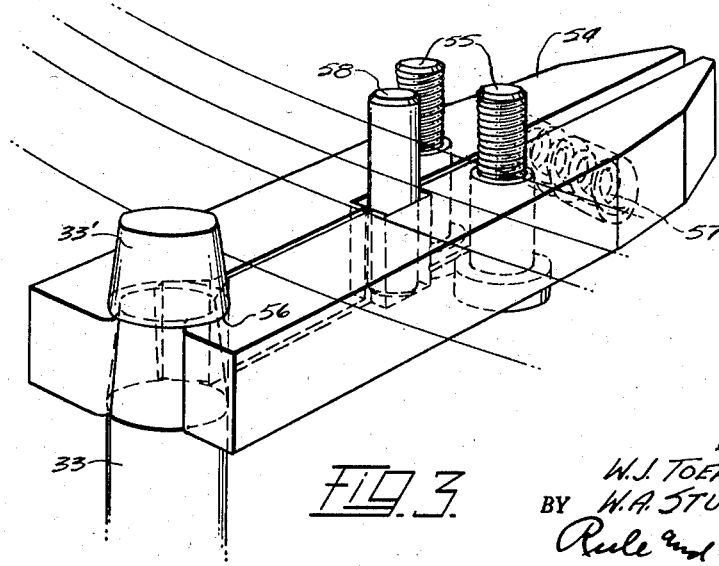
Fig. 3 is a perspective view on a comparatively large scale of a pair of clamping fingers for holding a screw on the screw conveyor or carriage.

The screw conveyor or carrier 50 (Figs. 12 and 13) is in the form of a ring bolted to a plate 51 mounted for rotation about the center column 21, in a plane above that of the mold carriage, as shown in Fig. 4. The screws 33 are removably attached to the conveyor 50 by pairs of spring loaded fingers 54. The fingers of each pair are mounted on the underside of the ring 50, on pivots 55 (see Fig. 3). The fingers protrude beyond the periphery of the ring 50 and are formed at their outer ends with recesses 56 to receive the screw 33. Each pair of fingers is spring loaded by a coil spring 57 under compression for gripping the screw beneath the screw head 33¹. The guide pin 58 attached to the ring 50 holds the pair of fingers in their radial position on the ring. The pairs of fingers 54 are arranged at equally spaced intervals circumferentially of the ring 50.

The ring 50 is rotated clockwise step by step in synchronism with or timed relation to the step rotations of the mold carriage counterclockwise, thereby bringing the screws 33 in succession to a take-out station 33ª (Fig. 12) at which they are taken out and transferred to the press plunger. The means for rotating the ring comprises a piston motor 60. The piston rod 61 is connected by a pivot 62 to a rocker 63 mounted for rocking movement about the center column 21. A dog 64 mounted on the rocker 63 engages a toothed wheel 65 connected to rotate with the ring 50. The motor 60 is pivoted to swing about the axis of a pivot pin 66 by which the motor is mounted in arms 67 attached to a bracket arm 68. The latter is bolted to a vertical stationary rod 69 forming a part of the machine frame. When the piston 61 is projected the rocker 63 moves from the full line position to the broken line position 63ª (Fig. 12) so that the conveyor ring 50 is rotated one step by the dog 64. The ring is then held stationary by a locking device 70 which comprises a slide bar 71 (Figs. 13, 14). The slide bar is formed with a detent 72 which engages the toothed wheel 65. When the motor piston is retracted a cam 73, connected to swing with the rocker 63, moves the slide bar outwardly and thereby disconnects the detent 72 and permits the indexing operation. As the indexing movement of the ring 50 is completed a coil spring 74 moves the dog 72 to locking position.

Means for transferring the screws 33 from the carrier 50 to the press plunger comprises a transfer arm 75 (Figs. 8–11 and 19). The arm is attached by screws 76 to a carrier frame 77 mounted to rock about a shaft 78. A cup 79 is mounted in the outer end of the arm and adapted to hold a screw 33 during the transfer. The arm 75 is rocked about the shaft 78 by a piston motor 81 which is mounted for rocking movement about a horizontal pivot 82 in a bracket 83. The bracket is carried on a stationary frame 84. The motor piston 85 is connected by a pivot 86 to a bracket 86ª attached to the frame 77. A stop screw 86ᵇ (Fig. 11) adjustably limits the swing of the arm 75. Means for lifting and lowering the arm 75 comprises a piston motor 120 (Figs. 1 and 19). The piston rod 121 of the motor has a screw-threaded connection with the frame 77. With the arm 75 in the full line position (Fig. 9), namely, the position 75ª (Fig. 15) the cup 79 is directly beneath a screw on the ring 50 as shown in broken lines on Fig. 12. A piston motor 88 (Fig. 13) then projects the releasing device 90 (Fig. 15) to grip the tapered ends of the fingers 54 thereby releasing the screw so that it drops into the cup 79. The motor 81 then swings the arm 75 to the position 75ᵇ (Fig. 15) in which the screw 33 is directly below and in vertical alignment with the press plunger 31. The arm 75 is then lifted by the motor 120 to the position 75ᶜ and thereby carries the screw upward to the press plunger 31 in which it is held by the spring actuated clamp 91 (Figs. 8 and 20). The arm is then lowered and swung away from the plunger. The plunger is now lowered for lowering the screw 33 into the mold, pressing and forming the glass within the mold and molding it around the screw 33. The piston motor 127 then operates to release the latch 91 and the plunger is lifted away from the mold.

The mold with the molded article and screw therein is carried step by step by the rotation of the mold carriage to a screw take-out station at which the screw is unthreaded and removed from the molded article. The means for removing the screw (Figs. 5–7 and 21) includes a chuck 95 carried at the lower end of a chuck spindle 96. The spindle shaft 96 is mounted for a combined rotative and vertical movement for rotating the chuck and unscrewing the screw 33 from the glass in the mold. For this purpose the shaft is splined for up and down movement in a sleeve 97 journalled in the frame 98. The sleeve is formed with external gear teeth meshing with a gear 99 keyed to a vertical shaft 100 journalled in the frame 98. Intermeshing bevel gears 101, 102 provide a driving connection between the shaft 100 and a horizontal shaft 103. The shaft 103 is rotated by a piston motor 104 (Fig. 4). A rack 105 attached to the piston rod engages a pinion on the shaft 103. The motor 104 operates through the train of gearing just described to rotate the chuck spindle shaft 96. The shaft as it rotates is given a spiral movement by means of an externally screw-threaded sleeve 107 connected to rotate with the shaft and working in the internally threaded sleeve or nut 108. The screw thread on the sleeve 107 has the same pitch as the thread on the screw 33. Mounted for free rotation on the shaft 96 at the upper end thereof, is a collar 109. When the shaft and chuck are lowered to grip a screw, the collar 109 rests on the upper end of the sleeve 107. The upward spiral movement of the sleeve 107 when the spindle shaft 96 is rotated, carries the collar 109 and shaft upward with the sleeve, thereby withdrawing the screw 33 from the molded article. When the screw is clear of the glass, the shaft 96, chuck 95 and attached screw 33 are lifted by an arm 115 to an elevated position. The arm 115 is actuated by a piston motor 116. The screw 33 is now transferred to the carrier 50 by a transfer arm 110 which is similar in construction to the transfer arm 75 and is operated in a similar manner by a piston motor 120ª (Fig. 1).

Referring to Fig. 21, the chuck 95 includes a pair of gripping jaws 130 mounted for horizontal sliding movement toward and from each other for gripping and releasing the screw 33. Means for operating the jaws 130 includes a piston motor 131. The piston rod 132 of the motor is operatively connected through a pair of bell crank levers 133 to the jaws 130. Air under pressure for operating the motor 131 is supplied through pipes 134, 135 to conduits 136 and 137 extending to the motor cylinder.

Referring to Fig. 16, when a screw 33 has been withdrawn from a molded article by the chuck 95 and lifted away from a mold the transfer arm 110 is swung from the position 110ª to the position 110ᵇ in which the cup 79 is directly beneath the check 95 and screw 33. The arm 110 is then lifted to the dotted line position 110ᵇ to receive the screw 33. The piston motor 131 (Fig. 21) then operates to open the chuck and release the screw. The arm 110 is then lowered with the screw therein as shown 110ᶜ, then swung to the position 110ᵈ, then lifted to project the screw into a pair of fingers 54. The fingers grip the screw beneath the head 33¹ (Fig. 3) permitting the empty arm to be lowered and returned for receiving the next succeeding screw 33.

Means for controlling, regulating, and varying the temperature of the screws 33 are provided, such means includes a blower 112 (Fig. 1) by which cooling air may be directed against the bare screws 33. This provides a means for cooling the screws to any desired extent. Burners 113 are arranged beneath the screws for reheating them where necessary or desirable before they are introduced into the molds.

Modifications may be resorted to within the spirit and scope of our invention.

We claim:

1. A machine for press molding glass articles, comprising a mold carriage mounted for rotation about a vertical axis, an annular series of molds mounted on the carriage and each formed with a mold cavity, means for rotating the carriage intermittently, step by step, and thereby bringing the molds in succession to a molding station, a multiplicity of molding elements each formed with a screw-threaded molding surface adapted to mold an interior screw-threaded surface on an article within the mold, a carrier for said elements mounted for rotation about the axis of the mold carriage, gripping devices on the carrier each comprising a pair of spring-actuated gripping jaws for releasably attaching the molding elements to the carrier, means for rotating the carrier and bringing the molding elements in succession to a transfer station, a transfer arm, a cup on the transfer arm, means for swinging said arm and bringing the cup directly beneath one of said gripping devices on the carrier, means for then actuating the gripping device and releasing the molding element from the carrier and dropping it by gravity into the cup at said transfer station, means for reversing the movement of said arm and thereby transferring the molding element to the molding station, a press plunger at the molding station comprising means for receiving the molding element from said arm, and means for operating the press plunger and thereby embedding the molding element in a charge of molten glass within a mold at the molding station and molding the glass, a take-out device including means for gripping the embedded molding element, means for rotating the gripping device spirally and thereby unscrewing the molding element from the molded article, means for then moving the gripping device and molding element upwardly from the mold, a second transfer arm, a cup carried by said second arm, means for swinging said second arm into a position in which the cup is directly beneath the molding element, means for then moving the second arm upwardly and bringing the cup into contact with the molding element, means for actuating the gripping means of the take-out device and thereby releasing the molding element to the cup on said second transfer arm, means for then lowering said second transfer arm and the cup with the molding element therein, means for then swinging said second arm in the reverse direction and thereby returning the molding element to a position beneath a pair of the spring-actuated gripping jaws on the carrier and then lifting said second arm and thereby placing the molding element in the gripping jaws.

2. A machine for molding glass articles, comprising a mold carriage mounted for rotation about a vertical axis, molds arranged in an annular series on the carriage, means for rotating the carriage, step by step, about its axis and thereby bringing the molds in succession to a molding station, a plurality of molding elements, a horizontal circular carrier for the said elements mounted for rotation about a vertical axis, means for rotating the carrier, step by step, in synchronism with the said step movements of the mold carriage, holders for the molding elements mounted on said carrier and spaced at intervals circumferentially thereof corresponding to the step movements of the carrier and bringing the molding elements in succession to the transfer station, said holders each comprising a pair of gripping arms mounted on the carrier with the arms projecting beyond the periphery of the carrier, spring means for operating said arms and gripping a molding element positioned between the projecting ends of the arms, a horizontal transfer arm, a vertical rock shaft carrying said transfer arm, a cup on said transfer arm, means for rocking said rock shaft and bringing the cup directly beneath a molding element held in the said gripping arms, automatic means for actuating said arms and releasing the molding element and dropping it by gravity into said cup, means for then swinging the transfer arm and carrying the molding element into a position over a mold on the carriage, and means for transferring said molding element from the swinging arm to the mold.

3. A machine for press molding glass articles, comprising a mold carriage mounted for rotation about a vertical axis, an annular series of molds mounted on the carriage and each formed with an upwardly opening mold cavity, means for rotating the carriage intermittently, step by step, about said axis and thereby bringing molds in succession to a molding station, a multiplicity of molding elements each formed with a screw-threaded molding surface for molding an interior screw-threaded surface in an article within the mold, a horizontally disposed circular carrier mounted for horizontal rotation about an axis, a press plunger including a plunger head positioned over the path of the molds, means for moving the plunger up and down to and from a position above the plane of said carrier, means for releasably attaching the molding elements to the carrier comprising spring-actuated pairs of gripping jaws positioned along the periphery of the carrier, a transfer arm mounted for horizontal rocking movement about a vertical axis, said arm being positioned below the level of said carrier and above the path of movement of the molds, a cup on said arm forming a container for one of the said molding elements, means for rocking said arm at said level and thereby bringing the cup directly beneath a molding element on the carrier, means for then operating the spring-actuated gripping jaws which hold the last mentioned molding element and thereby releasing the molding element and dropping it into the cup therebeneath, means for then swinging said arm horizontally to a position in which the cup with the molding element therein is between a mold and the plunger head, means for then lifting said arm, means on said plunger head for gripping the molding element when said arm is lifted, means for then lowering the arm and swinging it out of the path of the plunger head, means for then lowering the plunger and molding element, thereby molding a charge of glass to form an article within the mold with the said molding element embedded in the article, a take-out mechanism at a take-out station, said take-out mechanism including a gripping device mounted over the path of the molds, said gripping device comprising a pair of gripping jaws, means for lowering the gripping device and operating said jaws to grip the said embedded molding element, means for rotating the gripping jaws and the molding element spirally and thereby withdrawing the molding element from the molded article, a second transfer device for transferring the molding element back to the said carrier, said second transfer device comprising a vertical rock shaft, a rock arm extending radially therefrom, a transfer cup carried by said rock arm, means for rocking said rock arm horizontally about its vertical axis to a position in which the cup carried thereby is beneath the molding element, means for then opening the gripping jaws and dropping the molding element into the cup carried by the rock arm, means for then swinging the latter about its vertical axis and thereby carrying the molding element to a position beneath the path of said carrier, with the said molding element beneath and in vertical register with a pair of the gripping jaws on the carrier, means for then lifting said second transfer device and thereby placing the molding element in the gripping jaws, and then lowering said second transfer device.

4. A machine for molding glass articles, comprising a mold carriage, molds thereon, means for driving the carriage and bringing the molds in succession to a press molding station, a press plunger mounted at said station for up-and-down movement, molding elements, a carrier for said elements, holding means on the carrier for holding said elements, a transfer arm, means on said arm for holding a molding element, means for moving said arm transversely in a horizontal plane to a position beneath the said carrier and a molding element thereon and moving said arm in said plane from said position beneath the carrier to a position beneath the press plunger while the latter is in its upper position, means for releasing a molding element from its holding means on the carrier and dropping the molding element into the holding means on said arm, means for lifting the arm with the molding element thereon while the latter is beneath the press plunger, and means carried by the press plunger to grip the molding element, the said carrier being circular and mounted for rotation about a vertical axis, the said holding means on the carrier comprising pairs of spring-actuated holding arms projecting horizontally beyond the periphery of the carrier, the molding elements comprising tapered end portions movable upwardly between the spring-actuated holding arms when the said transfer arm is lifted and thereby transferring the molding elements to the said holding arms.

5. The machine defined in claim 4 and in combination therewith, a take-out device for taking the said molding elements out of the molds, said molding elements comprising screw-threaded molding surfaces for molding screw threads in an article within the mold, said take-out mechanism comprising a pair of gripping jaws positioned over the path of movement of the molds and molding elements therein, means for lowering the gripping jaws, and gripping a molding element in a mold at the take-out station, means for then rotating the said gripping jaws spirally upward and thereby removing the molding element from the molded article.

6. A machine for molding glass articles comprising molds, a press plunger for press molding the articles within the molds, molding elements adapted to be introduced into the molds, a circular carrier for the molding elements, means for rotating the carrier about a horizontal axis, a plurality of holding devices on the carrier, each of said holding devices comprising a pair of radially disposed arms projecting outwardly beyond the periphery of the carrier, spring means for operating said arms and gripping a molding element when the latter is moved between the projecting portions of said arms, and transfer means comprising transfer arms by which the molding elements are transferred from the carrier to the molds and returned to the said holding devices on the carrier, and means for actuating said transfer arms.

7. The combination set forth in claim 6, the molding elements being of substantially cylindrical form and having tapered end portions, and means for moving the molding elements upwardly between the said projecting arms.

8. A machine for molding glass articles, comprising a mold carriage, molds thereon, means for driving the carriage and bringing the molds in succession to a press molding station, a press plunger mounted at said station for up-and-down movement, molding elements, a carrier for said elements, holding means on the carrier for holding said elements, a transfer arm, means on said arm for holding a molding element, means for moving said arm transversely in a horizontal plane to a position beneath the said carrier and a molding element thereon and moving said arm in said plane from said position beneath the carrier to a position beneath the press plunger while the latter is in its upper position, means for releasing a molding element from its holding means on the carrier and dropping the molding element into the holding means on said arm, means for lifting the arm with the molding element thereon while the latter is beneath the press plunger, and means carried by the press plunger to grip the molding element, a take-out device for taking the said molding elements out of the molds, said molding elements comprising screw-threaded molding surfaces for molding screw threads in an article within the mold, said take-out mechanism comprising a pair of gripping jaws positioned over the path of movement of the molds and molding elements therein, means for lowering the gripping jaws and gripping a molding element in a mold at the take-out station, means for then rotating the said gripping jaws spirally upward and thereby removing the molding element from the molded article, means for returning the molding elements from said take-out device to the said carrier, said last mentioned means including a second transfer arm mounted for horizontal movement, means on said second arm for holding a molding element, means for moving said second arm to a position in which the holding means thereon is beneath the gripping jaws of the take-out device, means for releasing the molding element from the take-out device and dropping it into the holding means on said second transfer arm, means for then moving the second transfer arm into position to bring the molding element beneath a holding means on the said carrier, and means for moving said second arm upwardly and thereby transferring the molding element to the holding means on the carrier.

References Cited in the file of this patent
UNITED STATES PATENTS

| | | |
|---|---|---|
| 998,673 | Burleigh | July 25, 1911 |
| 1,049,594 | Olsen | Jan. 7, 1913 |
| 1,522,150 | Smith et al. | Jan. 6, 1925 |
| 1,642,658 | Holmes | Sept. 13, 1927 |
| 2,146,346 | Nelson | Feb. 7, 1939 |
| 2,331,053 | Shillinger | Oct. 5, 1943 |